(12) United States Patent
Alasfour

(10) Patent No.: US 8,979,162 B1
(45) Date of Patent: Mar. 17, 2015

(54) VEHICULAR PHYSICAL DISABILITY ASSISTANCE DEVICE

(71) Applicant: Faisal A. O. Alasfour, Alsheab (KW)

(72) Inventor: Faisal A. O. Alasfour, Alsheab (KW)

( * ) Notice: Subject to any disclaimer, the term of this patent is extended or adjusted under 35 U.S.C. 154(b) by 0 days.

(21) Appl. No.: 14/169,123

(22) Filed: Jan. 30, 2014

(51) Int. Cl.
  B60N 2/02  (2006.01)
  B60N 3/02  (2006.01)

(52) U.S. Cl.
  CPC ............................ *B60N 3/023* (2013.01)
  USPC ................................... 296/65.03

(58) Field of Classification Search
  USPC ............. 296/1.02, 65.1, 65.03, 65.04, 65.11; 280/727
  See application file for complete search history.

(56) References Cited

U.S. PATENT DOCUMENTS

| 4,559,518 | A | 12/1985 | Latta, Jr. |
| 5,281,948 | A | 1/1994 | Estrada |
| 5,523,926 | A | 6/1996 | Gold |
| 5,613,755 | A | 3/1997 | Gold |
| 5,635,902 | A | 6/1997 | Hochstein |
| 5,852,400 | A | 12/1998 | Gold |
| 5,959,593 | A | 9/1999 | Hoshi |
| 6,149,359 | A | * 11/2000 | Cardona ................... 410/11 |
| 6,184,786 | B1 | 2/2001 | Medeiros |
| 6,213,526 | B1 | 4/2001 | Swanger et al. |
| 6,234,105 | B1 | 5/2001 | Lamparter |
| 7,068,160 | B2 | 6/2006 | Tourneur et al. |
| 7,431,546 | B2 * | 10/2008 | Panzarella et al. ........... 410/7 |
| 8,101,896 | B2 | 1/2012 | Alenizi |

FOREIGN PATENT DOCUMENTS

EP  0 470 284 A1  2/1992

* cited by examiner

*Primary Examiner* — Joseph D Pape
*Assistant Examiner* — Dana Ivey
(74) *Attorney, Agent, or Firm* — Richard C. Litman

(57) ABSTRACT

A vehicular physical disability assistance device includes a housing that fixes to an interior of a vehicle. A supporting member positioned with the housing can be placed into a retracted position and an extended position in relation to the housing. An actuating mechanism positioned with the housing moves the supporting member into the retracted position and the extended position. Embodiments of a vehicular physical disability assistance device can include a rotatable member within an interior of a vehicle and a supporting member positioned with the rotatable member. The rotatable member can be placed from an upward position into a downward position. An actuating mechanism drives the rotatable member to place the rotatable member in the upward position or in the downward position. Additional embodiments include a telescoping member in conjunction with the supporting member that can be positioned in a retracted position and an extended position.

17 Claims, 7 Drawing Sheets

VEHICULAR PHYSICAL DISABILITY ASSISTANCE DEVICE

BACKGROUND OF THE INVENTION

1. Field of the Invention

The present invention relates to physical disability assistance, and particularly to a vehicular physical disability assistance device.

2. Description of the Related Art

Physical disability assistance devices for vehicles can assist in the transportation of physically disabled individuals. Some of these devices can include wheelchair lifts or ramps, among other devices, that can allow a physically disabled individual, such as a person confined to a wheelchair, to enter and exit an interior of a vehicle. A present issue with these devices is that they may not offer further stabilization or support when the physically disabled individual enters, rides in, or exits the interior of the vehicle.

For example, if the physically disabled individual is confined to a wheelchair and is using a wheelchair ramp to enter or exit the interior of the vehicle, the individual may attempt to support themselves while using the ramp by grabbing onto a door with their hand. Obtaining support by grabbing onto the door can be difficult because the door might be too far away to reach by hand, or the door might sway while the individual is supporting themselves, or the interior of the door may not have any surfaces on which to grab onto. Further, while the physically disabled individual is riding as a passenger in the interior of the vehicle, the surface of the interior of the vehicle may not have any surfaces on which the individual can grab onto for support during the ride.

Thus, it is desirable for a vehicular physical disability assistance device that can assist a physically disabled individual in supporting themselves when entering, riding in, or exiting an interior of a vehicle.

Thus, a vehicular physical disability assistance device addressing the aforementioned problems is desired.

SUMMARY OF THE INVENTION

Embodiments of a vehicular physical disability assistance device are provided. The vehicular physical disability assistance device includes a housing that can be fixed to an interior of a vehicle. A supporting member positioned in conjunction with the housing can be selectively positioned into a retracted position and an extended position in relation to the housing. An actuating mechanism positioned in conjunction with the housing can selectively position the supporting member into the retracted position and the extended position. Another embodiment of a vehicular physical disability assistance device includes a rotatable member that can be fixed to an interior of a vehicle and a supporting member positioned in conjunction with the rotatable member. The supporting member can be selectively positioned from an upward position in the interior of the vehicle to a downward position in conjunction with a door of the vehicle by movement of the rotatable member. An actuating mechanism can rotatably drive the rotatable member to selectively position the support member in the upward position in the interior of the vehicle or in the downward position in conjunction with the door of the vehicle. Further embodiments of the vehicular disability assistance device include a telescoping member positioned in conjunction with the supporting member and adapted to be selectively positioned in at least one extended position when the supporting member is in the downward position in conjunction with the door of the vehicle and in at least one retracted position when the supporting member is in the upward position in the interior of the vehicle.

Unless otherwise indicated, these and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
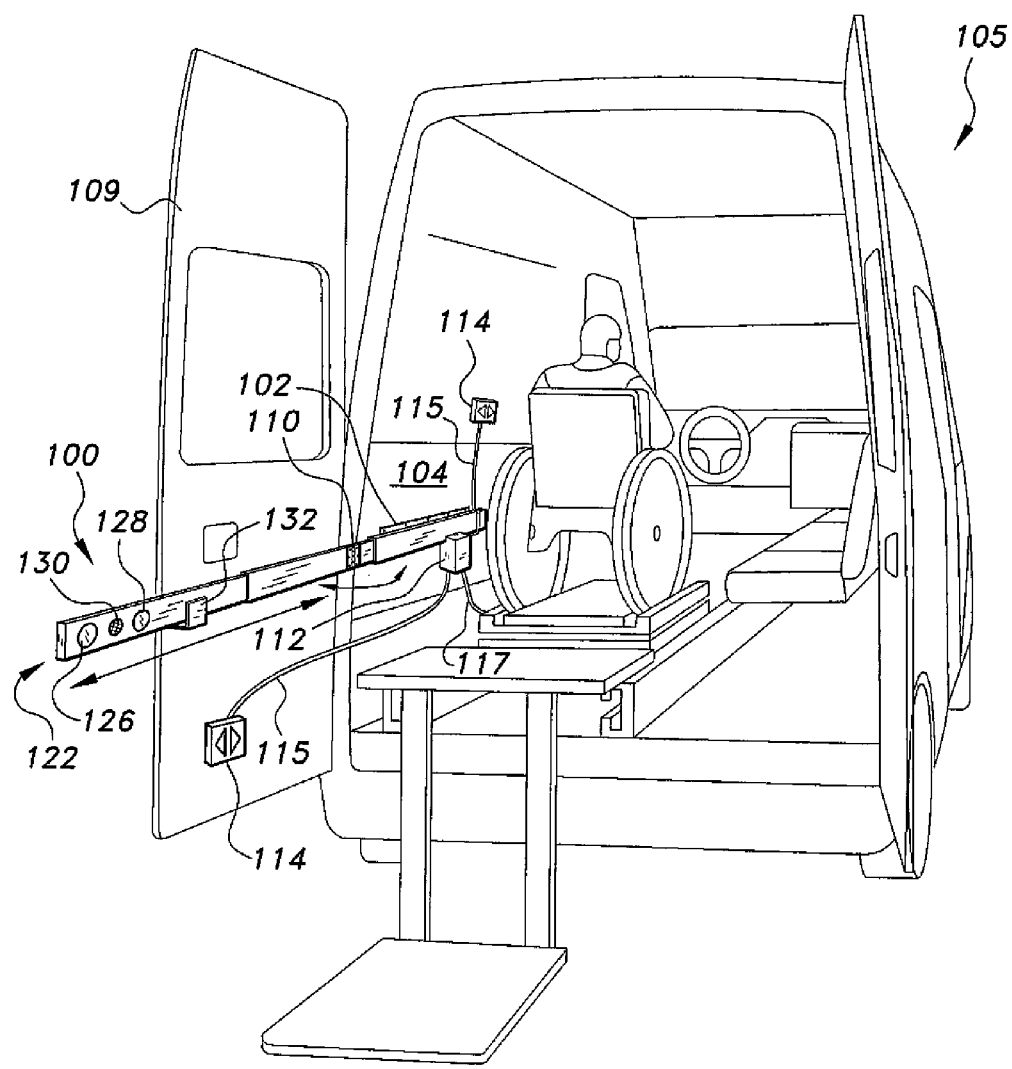
FIG. 1 is an environmental view of an embodiment of a vehicular physical disability assistance device having an embodiment of a support member in an extended position according to the present invention.

Referring to FIGS. 1, 2A, 2B and 3, an embodiment of a vehicular physical disability assistance device 100 is shown. The vehicular physical disability assistance device 100 includes a housing 102 that can be fixed to an interior 104 of a vehicle 105. The housing 102 of the vehicular physical disability assistance device 100 can be fixed to the interior 104 of the vehicle 105 by various securing mechanisms, such as fasteners or an adhesive, among others. The vehicle 105 which the vehicular physical disability assistance device 100 can be implemented with can be any type of common vehicle that can accommodate a disabled individual, for example a van, as shown in FIG. 1.

Figure 2A:
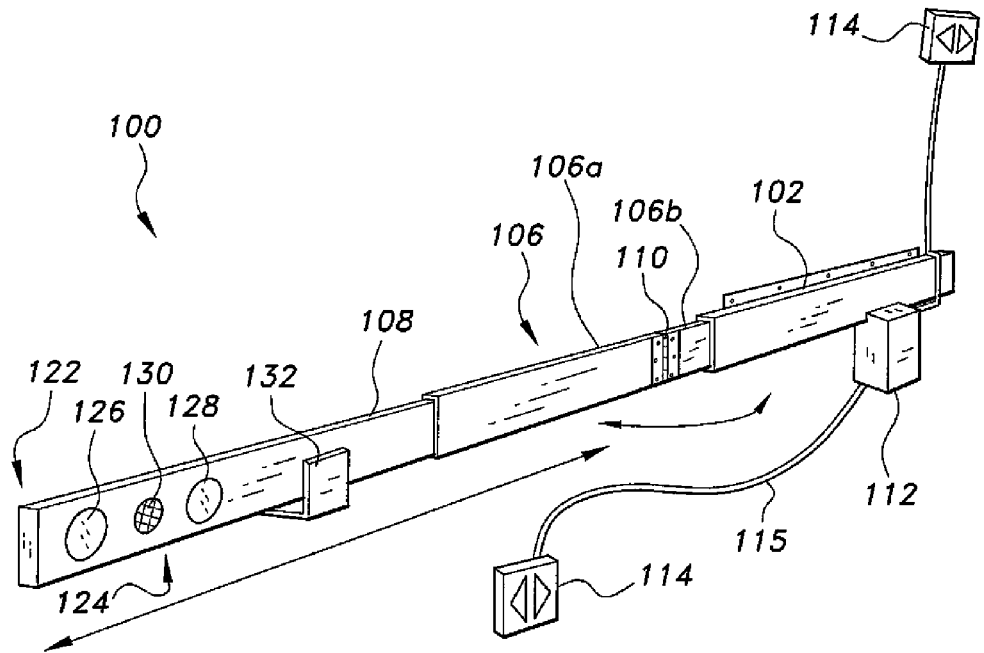
FIG. 2A is a perspective view of an embodiment of a vehicular physical disability assistance device having an embodiment of a support member in the extended position according to the present invention.
Figure 2B:
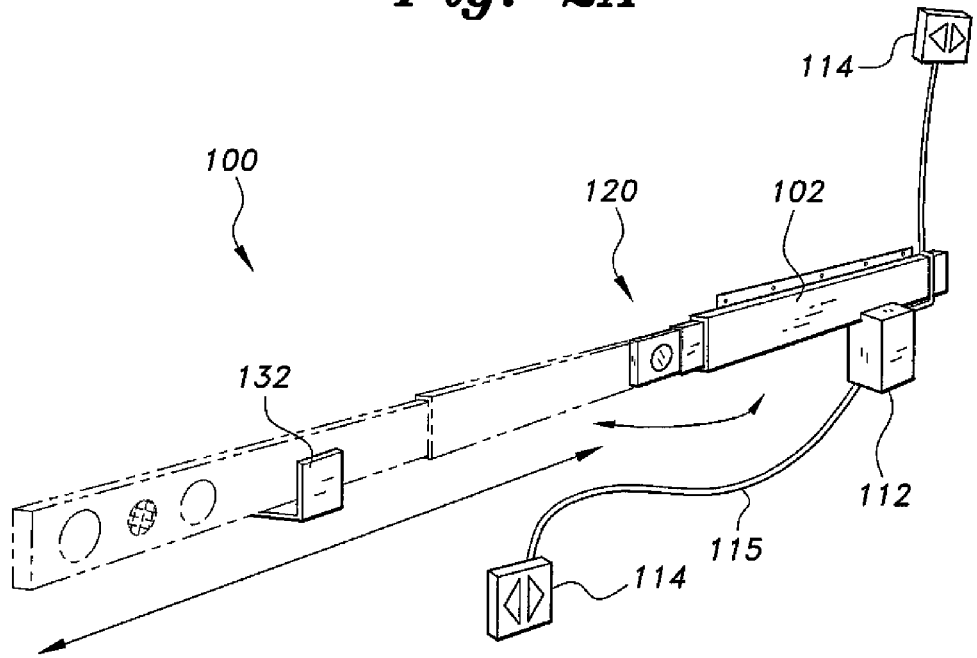
FIG. 2B is a perspective view of an embodiment of a vehicular physical disability assistance device having an embodiment of a support member in a retracted position according to the present invention.

The vehicular physical disability assistance device 100 includes a supporting member 106. The supporting member 106 is positioned in conjunction with the housing 102 of the vehicular physical disability assistance device 100 so that the supporting member 106 can remain within the interior 104 of the vehicle 105 when the supporting member 106 is in a retracted position 120, as shown in FIG. 2B. When the supporting member 106 is in an extended position 122, as shown in FIGS. 1 and 2A, the supporting member 106 can partially extend outside the interior 104 of the vehicle 105. The supporting member 106 further includes a telescoping member 108 as can also include the supporting member 106, shown in FIG. 2A, which is positioned in conjunction with the housing 102 of the vehicular physical disability assistance device 100. The telescoping member 108 is adapted to be selectively positioned along with the supporting member 106 in the extended position 122 and the retracted position 120 in relation to the housing 102.

A hinge member 110 can be positioned in conjunction with the supporting member 106, as shown in FIGS. 1 and 2A, or the hinge member 110 can be positioned in conjunction with the telescoping member 108, or one or more hinge members 110 can be positioned in conjunction with both the supporting member 106 and/or the telescoping member 108, depending on the user's needs, for example.

The hinge member 110 when positioned in conjunction with the supporting member 106 allows for at least a portion of the supporting member 106 to be movable in a generally horizontal plane such that the portion of the supporting member 106 and/or the telescoping member 108 when positioned in the extended position 122 can move in a corresponding relation to a door 109 of the vehicle 105. The supporting member 106 and/or the telescoping member 108 can include a plurality sections joined together by a corresponding hinge member 110, such as sections 106a and 106b of supporting member 106 illustrated in FIG. 2A, for example. Therefore, if the door 109 of the vehicle 105 is moved, the supporting member 106 and/or the telescoping member 108 can move along the same or substantially the same direction as the door 109 when the supporting member 106 is in the extended position 122 and can allow for the door 109 to be moved from an open position to a partially or fully closed position when the supporting member 106 and/or the telescoping member 108 is in the extended position 122, for example.

The hinge member 110 can potentially reduce the risk of damage to the supporting member 106 when the supporting member 106 is in the extended position 122 and the door 109 of the vehicle 105 is moved from an open position towards a closed position. The hinge member 110 when positioned in conjunction with the telescoping member 108 allows for the telescoping member 108 to be movable in a horizontal plane such that the telescoping member 108 when positioned in the extended position 122 can move in a corresponding relation to the door 109 of the vehicle 105, thereby potentially reducing the risk of damage to the telescoping member 108 when the door 109 of the vehicle 105 is moved from an open position towards a closed position.

Figure 3:
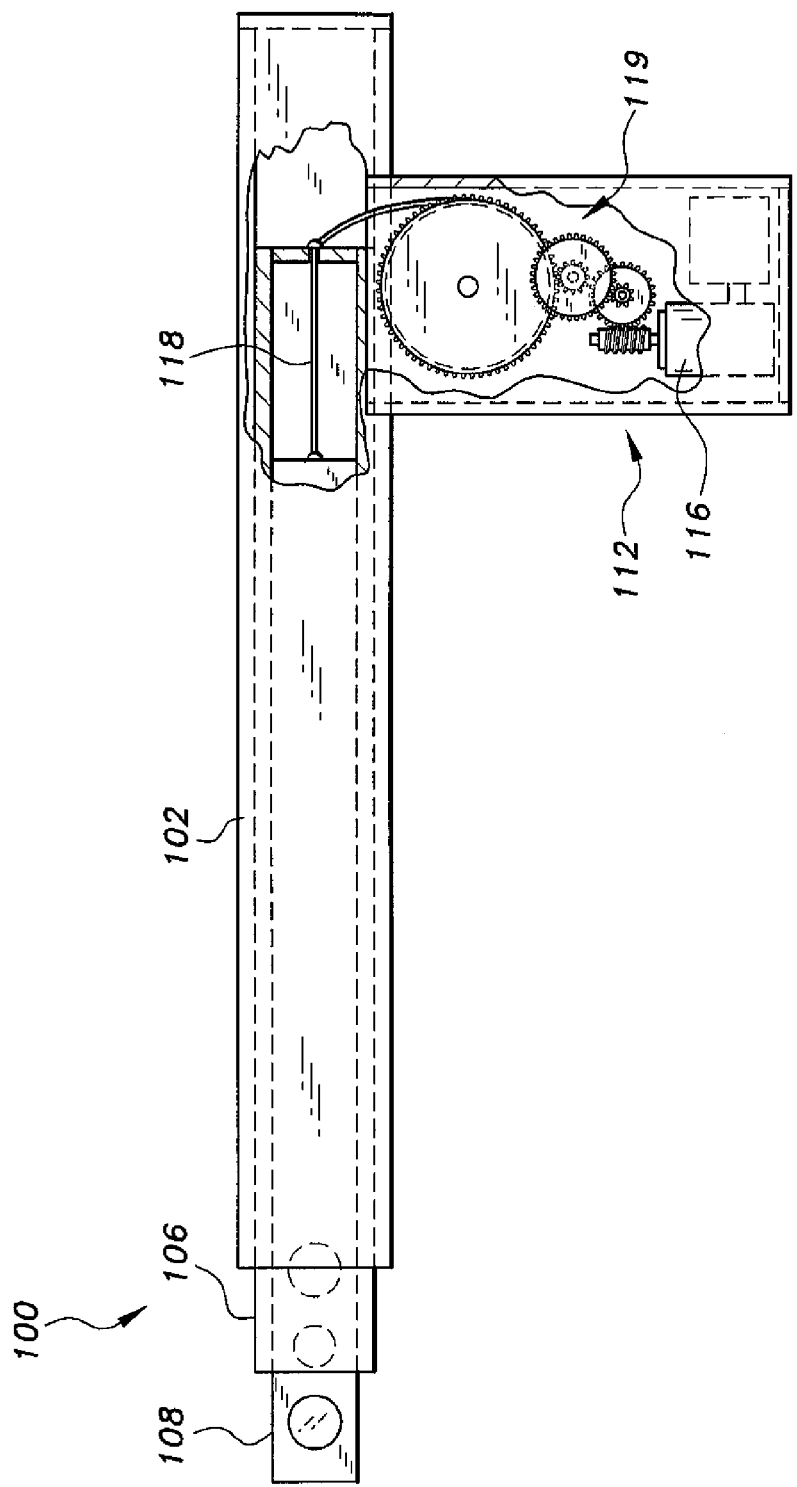
FIG. 3 is a sectional view of an embodiment of an actuating mechanism for an embodiment of a vehicular physical disability assistance device of FIGS. 1, 2A and 2B according to the present invention.

The supporting member 106 and/or the telescoping member 108 can be selectively positioned from the retracted position 120 and into the extended position 122 and from the extended position 122 into the retracted position 120 by an actuating mechanism 112. The actuating mechanism 112 is positioned in conjunction with the supporting member 106 through the housing 102 of the vehicular physical disability assistance device 100. As shown in FIG. 3, the actuating mechanism 112 includes a motor 116 in communication with a worm gear arrangement 119 and a biasing member 118 also in communication with the worm gear arrangement 119 to allow for the biasing member 118 to move in a forward direction and a backward direction to selectively move and position the supporting member 106 and the telescoping member 108. The biasing member 118 is also in communication with the supporting member 106 and the telescoping member 108 to selectively move the supporting member 106 and/or the telescoping member 108. The worm gear arrangement 119 can include a worm gear, a worm wheel, and a spur gear, for example.

A power supply line 117 powers the motor 116 of the actuating mechanism 112. The power supply line 117 can be connected to a power source located in the vehicle 105, such as a battery. At least one controller 114 is in communication with the actuating mechanism 112 to control the activation of the motor 116 and the biasing member 118 to selectively position the supporting member 106 and/or the telescoping member 108 into the retracted position 120 or the extended position 122 in relation to the housing 102. The at least one controller 114 can be in communication with the actuating mechanism 112 through a communication line 115 as shown in FIGS. 1-2B or can wirelessly communicate with the actuating mechanism 112 through a transmitter and receiver arrangement. The at least one controller 114 can include a plurality of control buttons such as on and off buttons, or can also include a processor and a memory as can contain instructions, to selectively extend and retract the supporting member 106 and/or the telescoping member 108, for example.

The vehicular physical disability assistance device 100 further includes at least one support bracket 132 positioned in conjunction with the vehicle 105. For example, as shown in FIG. 1, the at least one support bracket 132 can be positioned in conjunction with the door 109 of the vehicle 105. The supporting member 106 and/or the telescoping member 108 are adapted to communicate with the at least one support bracket 132 when the supporting member 106 and/or the telescoping member 108 is in the extended position 122, as shown in FIG. 1. The at least one support bracket 132 can allow a user to place their weight on the supporting member 106 and/or the telescoping member 108 and can provide self-support while using the vehicular physical disability assistance device 100 to enter or exit the interior 104 of the vehicle 105. The at least one support bracket 132 also allows for the supporting member 106 and/or the telescoping member 108 to move in conjunction with the door 109.

The vehicular physical disability assistance device 100 further includes a notification device 124 that serves to indicate that the supporting member 106 and/or the telescoping member 108 is in at least one extended position 122. The notification device 124 can include one or more of a warning light 126, a reflector 128, and an audible sound generator 130. The warning light 126 can be any common light source, such as a red bulb or a strobe light, among others. The audible sound generator 130 can include a speaker, for example. The notification device 124 can be positioned in conjunction with the supporting member 106 and/or the telescoping member 108, depending on the user's needs, and allows for an individual to be notified that the supporting member 106 and/or the telescoping member 108 is in at least one extended position 122.

Figure 4A:
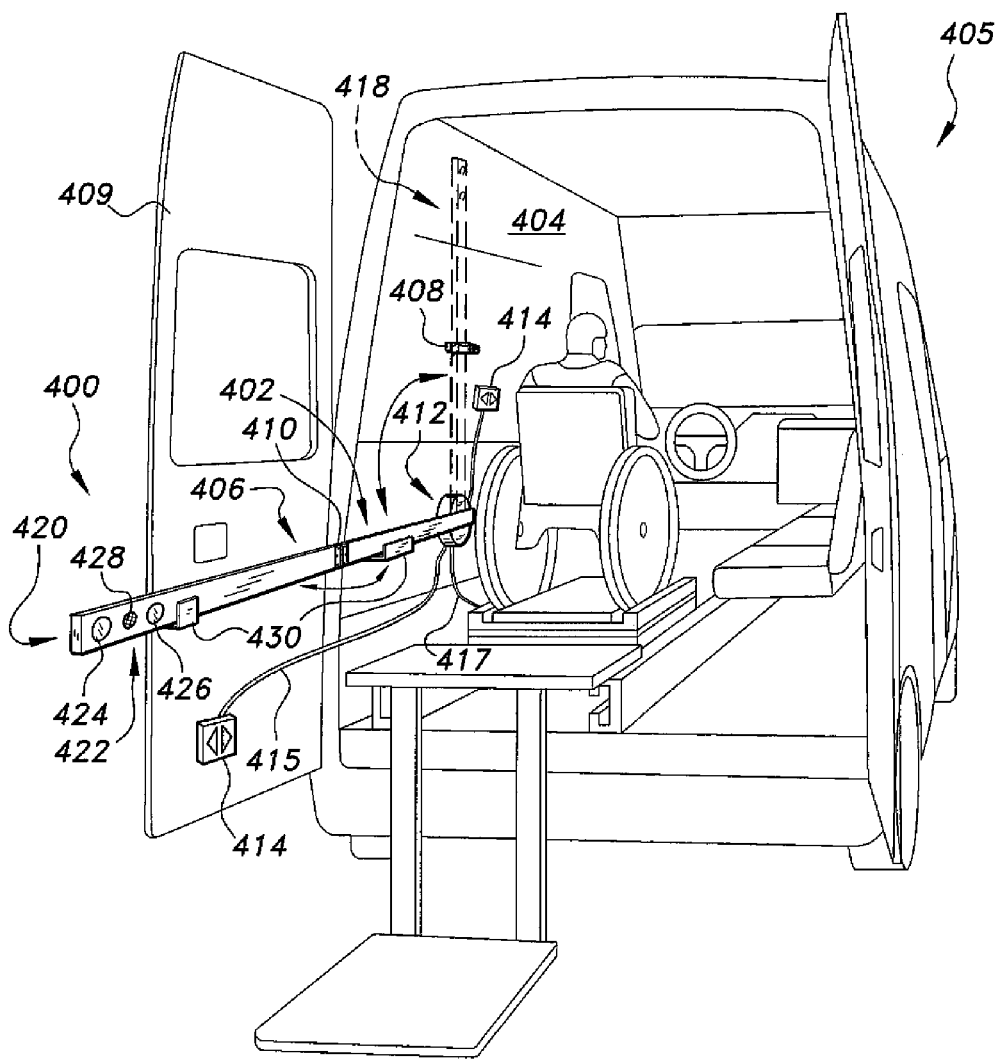
FIG. 4A is an environmental view of an embodiment of a vehicular physical disability assistance device having an embodiment of a rotatable member and a support member in a downward position according to the present invention.
Figure 4B:
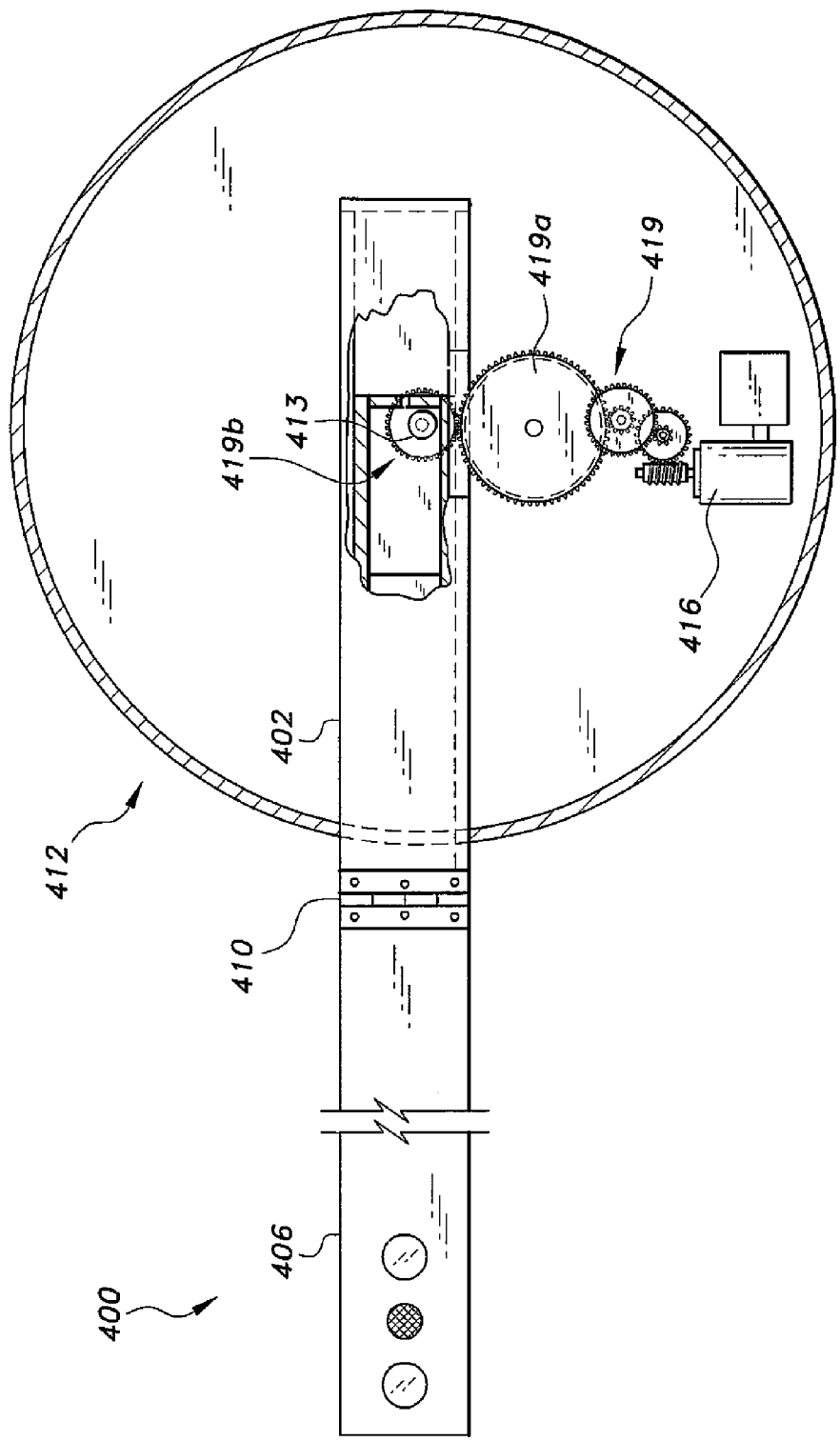
FIG. 4B is a sectional view of an embodiment of an actuating mechanism for an embodiment of a vehicular physical disability assistance device of FIG. 4A according to the present invention.

Referring to FIGS. 4A and 4B, an embodiment of a vehicular physical disability assistance device 400 is shown. The vehicular physical disability assistance device 400 includes a rotatable member 402 that is adapted to be rotatably positioned within at least a part of an interior 404 of a vehicle 405. The rotatable member 402 is positioned within the interior 404 of the vehicle 405 by being rotatably engaged with an actuating mechanism 412, the actuating mechanism 412 being secured to the interior 404 of the vehicle 405 by fasteners or an adhesive, for example. Positioned in conjunction with or included as a part of the rotatable member 402 is a supporting member 406. The supporting member 406 is adapted to be selectively positioned by movement of the rotatable member 402 from an upward position 418 while in the interior 404 of the vehicle 405 to a downward position 420 as can extend outward from the interior 404 of the vehicle 405 in conjunction with a door 409 of the vehicle 405.

When the supporting member 406 is in the upward position 418, the rotatable member 402 and/or supporting member 406 is adapted to communicate with at least one upward support bracket 408. The at least one upward support bracket 408 is positioned in conjunction with the vehicle 405. For example, as shown in FIG. 4A, the at least one upward support bracket 408 can be positioned within the interior 404 of the vehicle 405. By having the rotatable member 402 and/or supporting member 406 communicate with at least one upward support bracket 408, the user can use the rotatable member 402 and/or supporting member 406 for self-support while the user is positioned within the interior 404 of the vehicle 405. For example, if the user is riding as a passenger in the vehicle 405 while the vehicle 405 is being driven on a road, the user can use their hand to clutch the rotatable member 402 and/or supporting member 406, while the rotatable member 402 and/or supporting member 406 is in the upward position 418 and is communicating with at least one upward support bracket 408.

When the rotatable member 402 and/or supporting member 406 is in the downward position 420, the rotatable member 402 and/or supporting member 406 is adapted to communicate with at least one downward support bracket 430. The at least one downward support bracket 430 is positioned in conjunction with the vehicle 405. For example, as shown in FIG. 4A, a plurality of downward support brackets 430 are positioned in conjunction with the interior 404 and with the door 409 of the vehicle 405. A hinge member 410, similar to hinge member 110, is positioned in conjunction with the rotatable member 402 and/or supporting member 406. The hinge member 410 allows for at least a portion of the supporting member 406 to be movable in a generally horizontal plane such that the portion of the supporting member 406 when positioned in the downward position 420 can move in a corresponding relation to the door 409 of the vehicle 405, thereby potentially reducing the risk of damage to the supporting member 406, for example.

The actuating mechanism 412 rotatably drives the rotatable member 402 to selectively position the rotatable member 402 and/or supporting member 406 in at least one of the upward position 418 in the interior 404 of the vehicle 405 or in the downward position 420 in conjunction with the door 409 of the vehicle 405. Similar to the actuating mechanism 112 of the vehicular physical disability assistance device 100, the actuating mechanism 412 can include a motor 416 and a worm gear arrangement 419, and the worm gear arrangement 419 including a worm gear, a worm wheel, and a spur gear arrangement. The spur gear arrangement of the worm gear arrangement 419 includes a first drive gear 419a in communication with a second drive gear 419b. The second drive gear 419b is communicatively engaged to a suitable rotating mechanism 413 that is in communicative engagement with the rotatable member 402 for relative pivotal or rotational movement of the rotatable member 402, such as can include a standard pivot or pivoting mechanism, for example. Also, a power supply line 417, similar to power supply line 117, powers the motor 416 of the actuating mechanism 412.

At least one controller 414, similar to the controller 114 of the vehicular physical disability assistance device 100, is in communication with the actuating mechanism 412, to control the actuating mechanism 412 for selectively positioning the rotatable member 402 and/or supporting member 406 from at least one of the upward position 418 in the interior 404 of the vehicle 405 into the downward position 420 in conjunction with the door 409 of the vehicle 405 or from the downward position 420 into the upward position 418. As shown in FIG. 4A, the at least one controller 414 can communicate with the actuating mechanism 412 through a communication line 415 or can communicate wirelessly through a transmitter and receiver arrangement, for example. The at least one controller 414 can include a plurality of control buttons such as on and off buttons, or can also include a processor and a memory as can contain instructions, to selectively rotate the rotatable member 402 and/or supporting member 406, for example.

The vehicular physical disability assistance device 400 further includes a notification device 422, similar to the notification device 124 of the vehicular physical disability assistance device 100. The notification device 422 serves to indicate that the supporting member 406 is in at least one downward position 420. The notification device 422 can include one or more of a warning light 424, a reflector 426, and an audible sound generator 428. Similar to warning light 126 and audible sound generator 130, the warning light 424 can be any common light source and the audible sound generator 428 can include a speaker. The notification device 422 is positioned in conjunction with the supporting member 406 and allows for an individual to be notified that the rotatable member 402 and/or supporting member 406 are in at least one downward position 420.

Figure 5A:
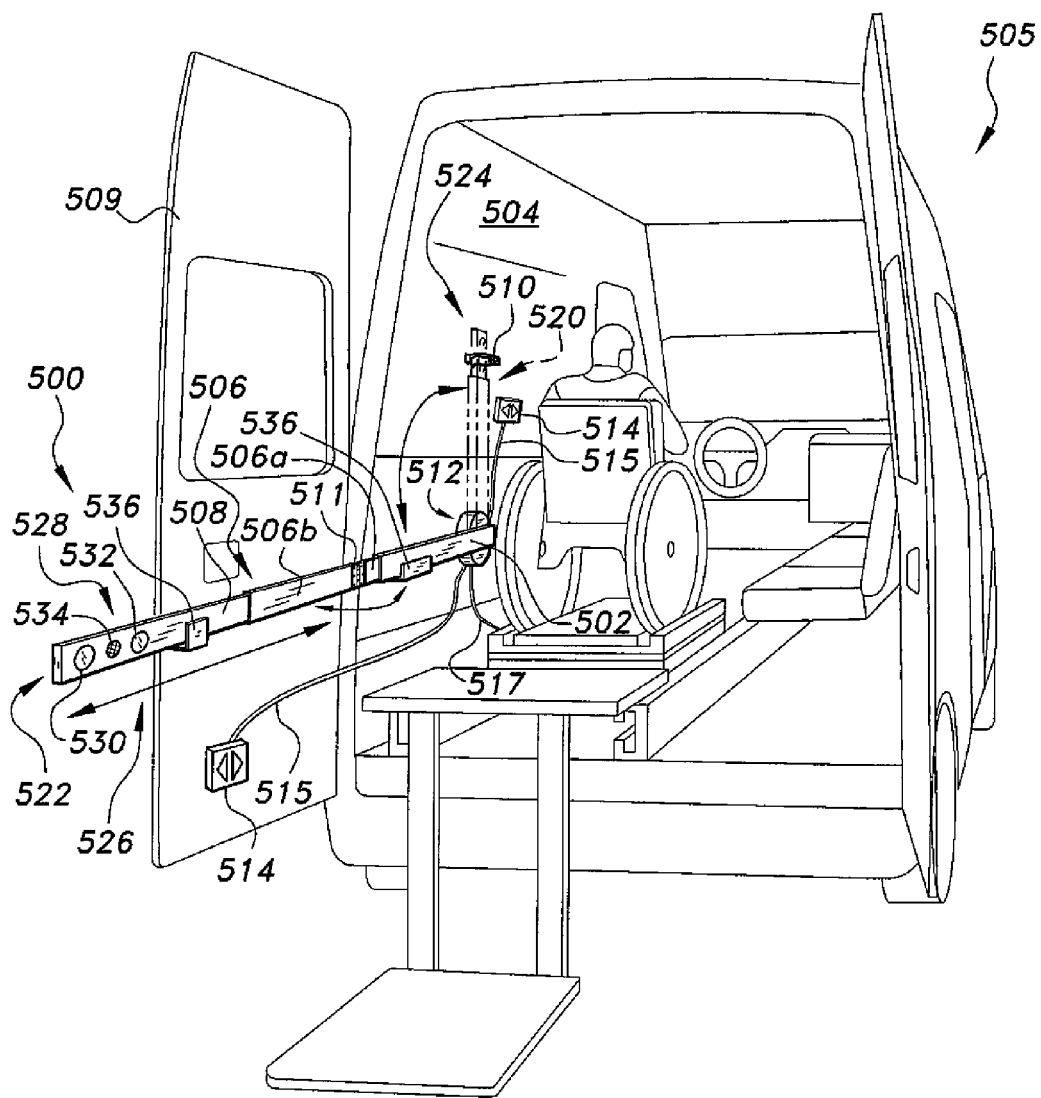
FIG. 5A is an environmental view of an embodiment of a vehicular physical disability assistance device having an embodiment of a rotatable member and a support member including a telescoping member in a downward position and in an extended position according to the present invention.
Figure 5B:
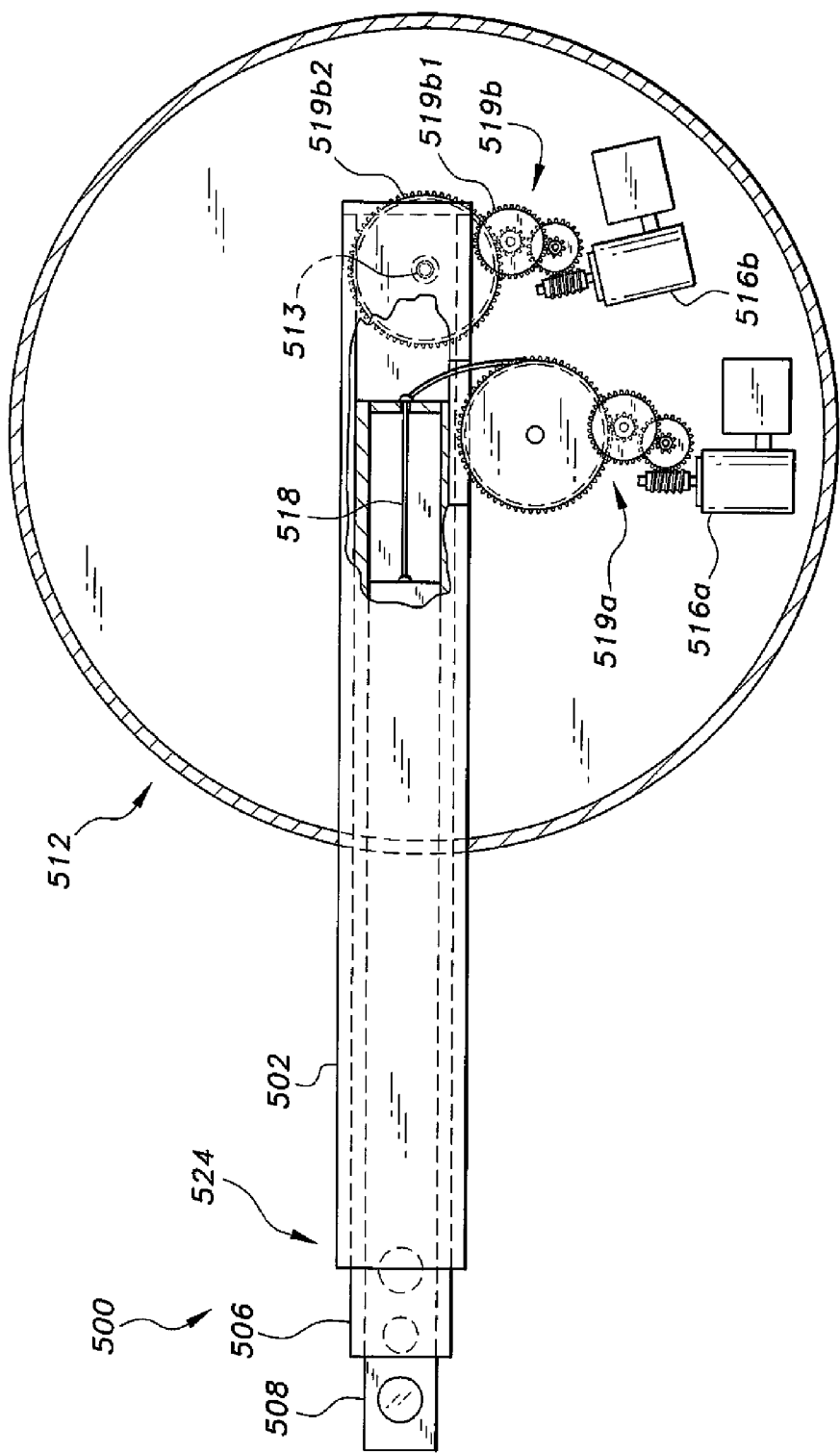
FIG. 5B is a sectional view of an embodiment of an actuating mechanism for an embodiment of a vehicular physical disability assistance device of FIG. 5A according to the present invention.

Referring to FIGS. 5A and 5B, an embodiment of a vehicular physical disability assistance device 500 is shown. Similar to rotatable member 402 of the vehicular physical disability assistance device 400, the vehicular physical disability assistance device 500 includes a rotatable member 502. The rotatable member 502 is adapted to be rotatably positioned within at least a part of an interior 504 of a vehicle 505. The rotatable member 502 is positioned within the interior 504 of the vehicle 505 by being rotatably engaged with an actuating mechanism 512, the actuating mechanism 512 being secured to the interior 504 of the vehicle 505 by fasteners or an adhesive, for example. Positioned in conjunction with or included as a part of the rotatable member 502 is a supporting member 506.

The supporting member 506 is positioned in conjunction with the rotatable member 502. Similar to supporting member 406 of the physical disability assistance device 400, the supporting member 506 is adapted to be selectively positioned by movement of the rotatable member 502 from an upward position 520 in the interior 504 of the vehicle 505 to a downward position 522 in conjunction with a door 509 of the vehicle 505. The supporting member 506 further includes a telescoping member 508 as can also include the supporting member 506, shown in FIG. 5A. The telescoping member 508 is adapted to be selectively positioned along with the supporting member 506 in the extended position 526 and in the retracted position 524.

Similar to telescoping member 108 of the vehicular physical disability assistance device 100, the supporting member 506 and/or the telescoping member 508 is adapted to be selectively positioned in at least one extended position 526 when the supporting member 506 and/or the telescoping member 508 are in the downward position 522 in conjunction with the door 509 of the vehicle 505 and in at least one retracted position 524 when the supporting member 506 is in the retracted position 524 while in the downward position 522 or is in the upward position 520 in the interior 504 of the vehicle 505.

When the rotatable member 502 and/or the supporting member 506 and/or the telescoping member 508 is in the upward position 520, the rotatable member 502 and/or the supporting member 506 and/or the telescoping member 508 is adapted to communicate with at least one upward support bracket 510. The at least one upward support bracket 510 is positioned in conjunction with the vehicle 505. For example, as shown in FIG. 5A, the at least one upward support bracket 510 can be positioned within the interior 504 of the vehicle 505. By having the rotatable member 502 and/or supporting member 506 and/or the telescoping member 508 communicate with at least one upward support bracket 510, the user can use one or more of the rotatable member 502 and/or the supporting member 506 and/or the telescoping member 508 for self-support while the user is positioned within the interior 504 of the vehicle 505. For example, if the user is riding as a passenger in the vehicle 505 while the vehicle 505 is being driven on a road, the user can use their hand to clutch one or more of the rotatable member 502 and/or the supporting member 506 and/or the telescoping member 508, while the rotatable member 502 and/or the supporting member 506 and/or the telescoping member 508 are in the upward position 520 and communicating with at least one upward support bracket 510.

When one or more of the rotatable member 502 and/or the supporting member 506 and/or the telescoping member 508 are in the downward position 522, the rotatable member 502 and/or the supporting member 506 and/or the telescoping member 508 are adapted to communicate with at least one downward support bracket 536. The one or more downward support brackets 536 are positioned in conjunction with the vehicle 505 and/or the door 509. For example, as shown in FIG. 5A, a plurality of downward support brackets 536 are positioned in conjunction with the interior 504 and with the door 509 of the vehicle 505.

At least one hinge member 511, similar to hinge member 110, is positioned in conjunction with the supporting member 506 and/or the telescoping member 508. When in one or more of the downward position 522 and/or in the extended position 526, the at least one hinge member 511 allows for at least a portion of the supporting member 506 and/or the telescoping member 508 to be movable in a generally horizontal plane such that the portion of the supporting member 506 and/or telescoping member 508 when positioned in the downward position 522 can move in a corresponding relation to the door 509 of the vehicle 505, thereby potentially reducing the risk of damage to the supporting member 506 and/or telescoping member 508, for example.

The supporting member 506 and/or the telescoping member 508 can include a plurality sections joined together by a corresponding hinge member 511, such as sections 506*a* and 506*b* of supporting member 506 illustrated in FIG. 5A, for example. Therefore, if the door 509 of the vehicle 505 is moved, the supporting member 506 and/or the telescoping member 508 can move along the same or substantially the same direction as the door 509 when supporting member 506 and/or the telescoping member 508 are in the extended position 526 and can allow for the door 509 to be moved from an open position to a partially or fully closed position when the supporting member 506 and/or the telescoping member 508 are in the extended position 526, for example.

Referring to FIGS. 5A and 5B, an actuating mechanism 512 rotatably drives the rotatable member 502 to selectively position the rotatable member 502 and/or the supporting member 506 and/or the telescoping member 508 in at least one of the upward position 520 in the interior 504 of the vehicle 505 or in the downward position 522 in conjunction with the door 509 of the vehicle 505, similar to the movement created by the actuating mechanism 412 of the vehicular physical disability assistance device 400. Further, the actuating mechanism 512 can selectively position the supporting member 506 and/or the telescoping member 508 from the retracted position 524 into the extended position 526 and from the extended position 526 into the retracted position 524, similar to the actuating mechanism 112 of the vehicular physical disability assistance device 100.

In this regard, the actuating mechanism 512 can combine features of the actuating mechanism 112 for movement from the retracted position 524 into the extended position 526 and from the extended position 526 into the retracted position 524, and features of the actuating mechanism 412 for rotational movement from and to the upward position 520 or the downward position 522. The actuating mechanism 512 is positioned in conjunction with the rotatable member 502 and is also positioned in conjunction with the supporting member 506 and the telescoping member 508. The actuating mechanism 512 is secured to the interior 504 of the vehicle 505 by fasteners or an adhesive, for example.

For example, referring to FIG. 5B, similar to the actuating mechanism 112, the actuating mechanism 512 includes a motor 516*a* in communication with a worm gear arrangement 519*a* and a biasing member 518 also in communication with the worm gear arrangement 519*a* to allow for the biasing member 518 to move in a forward direction and a backward direction to selectively move and position the supporting member 506 and/or the telescoping member 508 in at least one extended position 526 and in at least one retracted position 524. The biasing member 518 is also in communication with the supporting member 506 and the telescoping member 508 to selectively move the supporting member 506 and/or the telescoping member 508. The worm gear arrangement 519*a* can include a worm gear, a worm wheel, and a spur gear, for example.

Also, referring to FIG. 5B, similar to the actuating mechanism 412, the actuating mechanism 512 rotatably drives the rotatable member 502 to selectively position the rotatable member 502 and/or supporting member 506 and/or the telescoping member 508 in the upward position 520 in the interior 504 of the vehicle 505 or in the downward position 522 in conjunction with the door 509 of the vehicle 505. Further, similar to the actuating mechanism 412 of the vehicular physical disability assistance device 400, the actuating mechanism 512 can include a motor 516*b*, a worm gear arrangement 519*b*, with the worm gear arrangement 519*b* including a worm gear, a worm wheel, and a spur gear arrangement. The spur gear arrangement of the worm gear arrangement 519*b* includes a first drive gear 519*b*1 in communication with a second drive gear 519*b*2. The second drive gear 519*b*2 is communicatively engaged to a suitable rotating mechanism 513 that is in communicative engagement with the rotatable member 502 for relative pivotal or rotational movement of the rotatable member 502, such as can include a standard pivot or pivoting mechanism, for example. Also, a power supply line 517, similar to power supply line 117 or 417, powers the motors 416*a* and 416*b* of the actuating mechanism 512.

At least one controller 514, similar to the controllers 114 and 414 of the vehicular physical disability assistance devices 100 and 400, respectively, is in communication with the actuating mechanism 512, to control the actuating mechanism 512 to control the activation of the motor 516*b* for pivotal or rotational movement for selectively positioning the rotatable member 502 and/or supporting member 506 and/or the telescoping member 508 from at least one of the upward position 520 in the interior 504 of the vehicle 505 into the downward position 522 in conjunction with the door 509 of the vehicle 505 or from the downward position 522 into the upward position 520. Also, the at least one controller 514 is in communication with the actuating mechanism 512 to control the activation of the motor 516a and the biasing member 518 to selectively position the supporting member 506 and/or the telescoping member 508 into the at least one retracted position 524 or the at least one extended position 526.

The at least one controller 514 can be in communication with the actuating mechanism 512 through a communication line 515 as shown in FIG. 5A or can wirelessly communicate with the actuating mechanism 512 through a transmitter and receiver arrangement. The at least one controller 514 can include a plurality of control buttons such as on and off buttons, or can also include a processor and a memory as can contain instructions, to selectively extend and retract the supporting member 506 and/or the telescoping member 508 or to selectively rotate the rotatable member 502 and/or supporting member 506 and/or the telescoping member 508, for example.

The vehicular physical disability assistance device 500 further includes a notification device 528 that serves to indicate that the rotatable member 502 and/or supporting member 506 and/or the telescoping member 508 is in the downward position 522, similar to the notification device 422. Further, the notification device 528, similar to notification device 124, can indicate that the rotatable member 502 and/or supporting member 506 and/or the telescoping member 508 are in at least one extended position 526. The notification device 528 can include one or more of a warning light 530, a reflector 532, and an audible sound generator 534. Similar to warning lights 126 and 424 and audible sound generators 130 and 428, the warning light 530 can be any common light source and the audible sound generator 534 can include a speaker. The notification device 528 can be positioned in conjunction with the supporting member 506 and/or the telescoping member 508 to allow for an individual to be notified that the rotatable member 502 and/or supporting member 506 and/or the telescoping member 508 is in at least one downward position 522 and/or is in at least one extended position 526.

The vehicular physical disability assistance devices 100, 400, and 500 and associated components can be made from a number of suitable materials, including stainless steel or resilient plastics, among others, for example. Further, the vehicular physical disability assistance devices 100, 400, and 500 are adapted to be positioned on either the driver side or the passenger side of the interiors 104, 404, and 504 of vehicles 105, 405, and 505, depending on the user's needs. The vehicular physical disability assistance devices 100, 400, and 500 are adapted to work in conjunction with other disability devices, such as a wheel chair ramp or lift, for example, and should not be construed in a limiting sense.

It is to be understood that the present invention is not limited to the embodiments described above, but encompasses any and all embodiments within the scope of the following claims.

I claim:

1. A vehicular physical disability assistance device, comprising:
    a housing, the housing adapted to be fixedly positioned to an interior of a vehicle;
    a supporting member, the supporting member positioned in conjunction with the housing, the supporting member adapted to be selectively positioned in at least one retracted position and at least one extended position in relation to the housing;
    wherein the supporting member includes at least one hinge member, the at least one hinge member being positioned to move at least a portion of the supporting member in a direction corresponding to a direction of movement of a door of the vehicle when the supporting member is in the at least one extended position; and
    an actuating mechanism, the actuating mechanism positioned in conjunction with the supporting member, the actuating mechanism to move the supporting member to selectively position the supporting member in the at least one retracted position and the at least one extended position.

2. The vehicular physical disability assistance device according to claim 1, wherein the actuating mechanism includes a motor, the actuating mechanism being associated with a controller to selectively control operation of the actuating mechanism.

3. The vehicular physical disability assistance device according to claim 1, wherein the actuating mechanism includes a biasing member in communication with the supporting member to move the supporting member in a forward direction to the at least one extended position and in a backward direction to move the supporting member to the at least one retracted position.

4. The vehicular physical disability assistance device according to claim 1, further comprising:
    a notification device to indicate the supporting member is in at least one extended position.

5. The vehicular physical disability assistance device according to claim 4, wherein the notification device is selected from the group consisting of one or more of a warning light, a reflector and an audible sound generator.

6. The vehicular physical disability assistance device according to claim 1, wherein the supporting member comprises a telescoping member, the telescoping member adapted to be selectively positioned in the at least one extended position and the at least one retracted position in relation to the housing.

7. The vehicular physical disability assistance device according to claim 6, wherein the telescoping member is adapted to communicate with at least one support bracket positioned in conjunction with the vehicle to support the telescoping member in at least one extended position.

8. The vehicular physical disability assistance device according to claim 1, wherein the supporting member is adapted to communicate with at least one support bracket positioned in conjunction with the vehicle to support the supporting member in the at least one extended position.

9. A vehicular physical disability assistance device, comprising:
    a rotatable member, the rotatable member adapted to be positioned at least in part within an interior of a vehicle;
    a supporting member, the supporting member positioned in conjunction with the rotatable member, the supporting member adapted to be selectively positioned by movement of the rotatable member from an upward position in the interior of the vehicle to a downward position in conjunction with a door of the vehicle;
    a telescoping member, the telescoping member adapted to be selectively positioned in at least one extended position when the supporting member is in the downward position in conjunction with the door of the vehicle and in at least one retracted position when the supporting member is in the upward position in the interior of the vehicle;
    at least one hinge member, the at least one hinge member being positioned to move at least a portion of the supporting member in a direction corresponding to a direction of movement of a door of the vehicle when the supporting member is in the at least one extended position; and an actuating mechanism, the actuating mechanism to rotatably drive the rotatable member to selectively position the supporting member in at least one of the upward position in the interior of the vehicle or in the downward position in conjunction with the door of the vehicle.

10. The vehicular physical disability assistance device according to claim 9, wherein the actuating mechanism includes a motor, the actuating mechanism being associated with a controller to selectively control operation of the actuating mechanism.

11. The vehicular physical disability assistance device according to claim 9, further comprising:
a notification device to indicate the supporting member is in the downward position in conjunction with the door of the vehicle.

12. The vehicular physical disability assistance device according to claim 11, wherein the notification device is selected from the group consisting of one or more of a warning light, a reflector and an audible sound generator.

13. The vehicular physical disability assistance device according to claim 9, wherein the telescoping member is adapted to communicate with at least one support bracket positioned in conjunction with the vehicle to support the telescoping member in the at least one extended position.

14. The vehicular physical disability assistance device according to claim 9, wherein the telescoping member is adapted to communicate with at least one support bracket positioned in conjunction with the vehicle to support the telescoping member.

15. The vehicular physical disability assistance device according to claim 9, wherein the rotatable member is adapted to communicate with at least one support bracket positioned in conjunction with the vehicle to support the rotatable member.

16. A vehicular physical disability assistance device, comprising:
a rotatable member, the rotatable member adapted to be positioned at least in part within an interior of a vehicle;
a supporting member, the supporting member positioned in conjunction with the rotatable member, the supporting member adapted to be selectively positioned by movement of the rotatable member from an upward position in the interior of the vehicle to a downward position in conjunction with a door of the vehicle;
wherein the supporting member includes at least one hinge member, the at least one hinge member being positioned in corresponding relation to a door of the vehicle when the supporting member is in the downward position to move at least a portion of the supporting member in a direction corresponding to a direction of movement of the door of the vehicle; and
an actuating mechanism, the actuating mechanism to rotatably drive the rotatable member to selectively position the supporting member in at least one of the upward position in the interior of the vehicle or in the downward position in conjunction with the door of the vehicle.

17. The vehicular physical disability assistance device according to claim 16, wherein the rotatable member is adapted to communicate with at least one support bracket positioned in conjunction with the vehicle to support the rotatable member.

* * * * *